United States Patent [19]
Collins et al.

[11] Patent Number: 5,463,683
[45] Date of Patent: Oct. 31, 1995

[54] BLOCKED CALL NOTIFICATION SYSTEM

[75] Inventors: Cynthia B. Collins, Hampton; Young Lee, Edison; Daniel D. Tagatac, Freehold, all of N.J.

[73] Assignee: AT&T Corp., Murray Hill, N.J.

[21] Appl. No.: 174,116

[22] Filed: Dec. 28, 1993

[51] Int. Cl.$^6$ .................................................. H04M 3/00
[52] U.S. Cl. ...................... 379/201; 379/207; 379/211; 379/212; 379/221; 379/265; 379/266
[58] Field of Search ..................................... 379/207, 209, 379/211, 212, 221, 265, 266, 201, 142

[56] References Cited

U.S. PATENT DOCUMENTS 5,008,930 4/1991 Gawrys et al. ........................ 379/211
5,023,868 6/1991 Davidson et al. ..................... 379/211
5,282,243 1/1994 Dabbaghi et al. ..................... 379/142
5,291,552 3/1994 Kerrigan et al. ...................... 379/207
5,299,259 3/1994 Otto ....................................... 379/207
5,311,574 5/1994 Livanos ................................. 379/209

Primary Examiner—Jeffery A. Hofsass
Assistant Examiner—Scott Wolinsky
Attorney, Agent, or Firm—John A. Caccuro

[57] ABSTRACT

A method and a system allow an inbound telecommunications subscriber to receive notification of blocked calls directed to that subscriber and other information associated with calls that are blocked due to lack of available egress facilities at the subscribers' premises communications systems.

24 Claims, 4 Drawing Sheets

| SUBSCRIBER ROUTING BLOCK | | |
|---|---|---|
| ROUTING NUMBER | CHANNEL IDENTIFIERS | |
| | CHANNEL ID | INTERFACE ID |
| RN | CHANNEL-ID-1 | TSG-1 |
| | CHANNEL-ID-2 | TSG-1 |
| | ⋮ | ⋮ |
| | CHANNEL-ID-23 | TSG-1 |
| | CHANNEL-ID-1 | TSG-2 |
| | CHANNEL-ID-2 | TSG-2 |
| | ⋮ | ⋮ |
| | CHANNEL-ID-24 | TSG-2 |

BLOCKED CALL NOTIFICATION SYSTEM

TECHNICAL FIELD

This invention relates to communication systems. More specifically, this invention relates to a method and a system for notifying a called party of blocked calls.

BACKGROUND OF THE INVENTION

Network and premises communications systems—even robust ones—are typically engineered to handle the so-called "average busy hour" traffic load because it is uneconomical to design communications systems to handle worst case "peak" loads. Thus, when the arrival rate of calls is beyond the average busy hour system capacity, calls are simply blocked resulting in the application of a busy tone to callers' telephone sets.

To reduce incidences of call blocking, large inbound telecommunications service subscribers usually lease bulk facilities, such as DS-1 lines that connect those subscribers' premises equipment to a communications carrier's terminating switch using a common interface such as, the Primary Rate Interface (PRI) of the Integrated Services Digital Network (ISDN) standards. A call directed to those inbound subscribers is blocked when the terminating switch determines that no circuit is idle in the leased facility.

Blocked calls directed to inbound telecommunications service subscribers result in economic losses for all parties involved. Callers are frustrated by their inability to communicate with the subscribers (or their representatives) to complete or inquire about commercial transactions of interest. From the subscribers' perspective, blocked calls represent potential losses of business. A more concrete economic loss is the uncompensated use of the switching and transmission facilities of the carrier or carriers that attempted to complete the blocked calls. Adding further economic injury is the fact that Interexchange carriers (IXC) incur access and/or egress charges for blocked calls. The problem is further compounded when repeated call attempts from persistent frustrated callers result in repeated blocked calls.

SUMMARY OF THE INVENTION

The present invention is directed to a method and a system that allow an inbound telecommunications subscriber to receive a) notification of blocked calls directed to that subscriber and b) other information associated with calls that are blocked due to lack of available egress facilities at the subscribers' premises communications systems.

In preferred embodiments of the invention, signaling information associated with incoming calls destined for a customer premises equipment, are received in a network switch connected to that customer premises equipment via a facility. The latter is comprised of one signaling channel and at least one communications channel. When no communications channel in that facility is available to complete an incoming call to the customer premises equipment, the switch sends the signaling information for that incoming call to the customer premises equipment via the signaling channel of the facility.

The network switch can be connected to a different facility which is assigned to, but not connected to the customer premises equipment. In accordance with a feature of the invention, an announcement from a voice information system connected to the different facility, may be presented to the caller indicating that his or her call cannot be completed. The announcement may prompt the caller for a callback number and/or other information. Alternatively, a conventional busy tone may be applied to the caller's telephone set.

DETAILED DESCRIPTION

Figure 1:
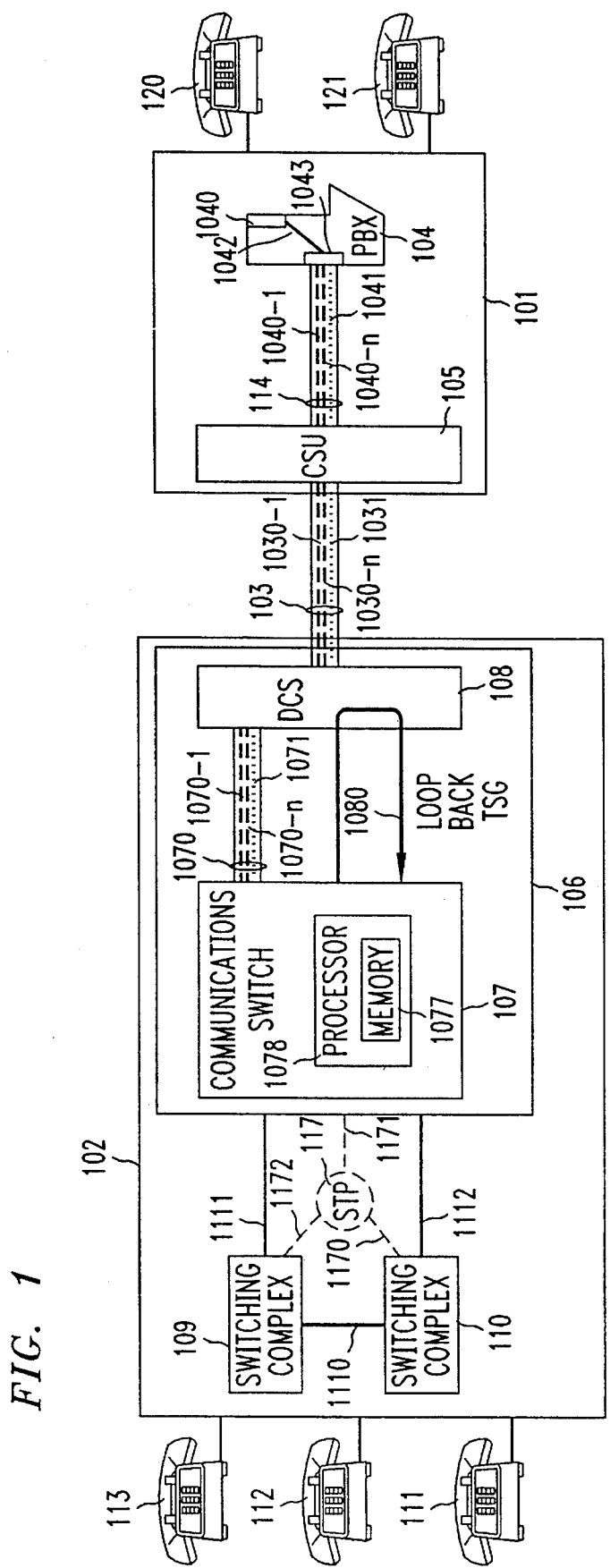
FIG. 1 shows in block diagram form, a configuration for a communication switching system designed to provide blocked call notification to an inbound subscriber.

FIG. 1 shows in block diagram form, a configuration for a communication switching system designed to provide blocked call notification to an inbound subscriber. In FIG. 1 a Customer Premises Equipment (CPE) 101 is shown connected to a network 102 via PRI ISDN circuits 103. The CPE 101 is comprised of a PBX 104 and a Channel Service Unit 105. PBX 104 is a telecommunication switching system which interconnects station sets at the premises, such as sets 120 and 121, and allows them to communicate between themselves and with other non-premises telephone sets via the digital circuits 103 to the switched telephone network 102. The central nerve of the digital PBX 104 is a communication processor 1040 which receives signaling messages from the D channel 1041 off Channel Service Unit (CSU) 105 and processes those signaling messages to direct incoming calls to particular idle telephone sets. CSU 105 terminates the digital circuits 103 at the subscriber's location and performs certain line conditioning functions and bipolar violation correction.

Another important component of digital PBX 104 is a high-speed digital multiplexed interface 1043 that allows communications between the PBX 104 and the network 102 carried over digital circuits 1043 comprised of 23 bearer (B) channels 1040-1 to 1040-n and one data (D) channel 1041. The bearer channels 1040-1 to 1040-N also called "communications channels" carry user-information to PBX 104 while the data channel, also called "signaling channel", carries signaling information such as call set up information to PBX 104. The digital multiplexed interface 1043 conforms to PRI ISDN standards adopted by international standard bodies, such as the International Telecommunications Union Telecommunications Standardization Sector, better known by its acronym "ITU-T". Digital circuits 103 also conform to the PRI ISDN standard. One of the key attributes of the PRI ISDN standard is the support for twenty-four 64 Kbps channels over a standard DS-1 facility. Of particular importance is the portion of the standard requiring the use of twenty-three of those channels to carry voice or data information (communications or bearer or B channels 1030-1 to 1030-n) and one common channel (data channel or D channel 1032) to exclusively carry signaling information for the other twenty-three channels. The ITU-T standard also allows the D channel 1031 to carry signaling information for more than the 23 channels in more than one DS-1 facility. The signaling channel 1031 can be used, for instance, to carry user information (ANI, calling party name) and terminating supervisory signals, thereby, allowing additional flexibility in call SETUP and termination procedures. Further information regarding ISDN standards in general, and PRI interface in particular, can be found in *AT&T Technical Journal*, Vol. 65, No. 6, Issue 1, pp. 1–55 January/February 1986. The PBX 104 may be implemented using for example, the AT&T Definity® digital PBX.

Also shown in FIG. 1 is a public switched telephone network 102 to which, telephone sets 111, 112 and 113 are connected. Public switched telephone network 102 may be a Local Exchange Carrier (LEC) network or an Interexchange Carrier (IXC) network. In the latter case, network 102 is connected to a LEC network which provides communications services to telephone sets 111, 112 and 113, which may be ISDN telephone sets. Public switched telephone network 102 is comprised of switching complexes 106, 109 and 110 that are interconnected via a) Intermachine trunks (IMT) 1110, 1111 and 1112, and b) a signaling network represented in FIG. 1 by STP 117 which is described in further detail below. In this example, the switching complex 106 is the terminating switching complex to which CPE 101 is connected. Switching complexes 106, 109 and 110 include communications switches, such as switch 107 in switching complex 106, that are processor-controlled, software-driven switching systems that operate as points of access and egress to network 102 for incoming and outgoing calls, respectively. Switching complexes 106, 109 and 110 exchange call handling messages via a data network called the Common Channel Signaling network. The latter is a packet switching network composed of a plurality of interconnected nodes called Signal Transfer Points (STP) that exchange call handling messages between switching complexes according to a specific protocol, such as CCS7. However, for the sake of simplicity, the signaling network is represented in FIG. 1 by a single Signal Transfer Point, namely STP 117. The features and functionality of an STP are described in the book *"Engineering and Operations in the Bell System"*, Second Edition, published by AT&T Bell Laboratories, at pages 292 through 294.

Switch 107 is comprised of a processor 1078 which is a wired-logic processing unit arranged to provide path information to route a call over the network. In particular, processor 1074 performs the functions necessary to interface incoming data signals with time-slot interface ports in the switch. Processor 1078 also insures that all received DS-1 level signals are frequency-locked to the switch 107 network clock. Processor 1078 includes a memory 1077 which contains the stored programs for all the control, call handling and administrative maintenance functions for the switch 107. In addition, the memory 1077 also stores routing tables, such as the one shown in FIG. 2, to translate routing numbers to channel identification numbers and interface identification numbers.

Switch 107 within switching complex 106 may be implemented using the AT&T No. 4ESS® switch or the AT&T 5ESS® switch. A detailed description of the inner workings of the AT&T No. 5ESS® is provided in *AT&T Technical Journal*, Vol. 64, No. 6, part 2, pp. 1305–1564, July/August, 1985. The features and functionality of the AT&T No. 4ESS® are explained extensively in *Bell System Technical Journal* (BSTJ), Vol. 56, No. 7, pp. 1015–1320, September, 1977.

Also included in switching complex 106 is a Digital Cross Connect System (DCS) 108. The latter is a computerized facility that allows DS-1 facilities, such as PRI ISDN Trunk SubGroups (TSG) 1070 and 1080 to be mapped electronically at the individual (DS-0) channel level. Of particular importance is a feature of DCS 108 which allows a signaling channel, such as channel 1032 of digital circuits 103 to carry signaling information associated with the bearer channels of multiple DS-1 facilities, such as TSG 1070 and loop back TSG 1080. The latter is a digital facility that originates from a digital interface frame of communications switch 107, loops back through DCS 108 and terminates on communications switch 107. Signaling information associated with the channels of loop back TSG 1080 is transmitted to CPE 101 via signaling channel (D channel) 1071 of TSG 1070 and signaling channel 1031 of digital circuits 103. The bearer channels of TSG 1070 (namely 1070-1 to 1070-N) and digital circuits 103 (namely 1030-1 to 1030-N) carry voice traffic associated with the incoming calls received by CPE 101. Similarly, bearer channels 1040-1 to 1040-N carry voice traffic to PBX 104 while signaling channel 1041 carries signaling information to PBX 104.

Figure 2:
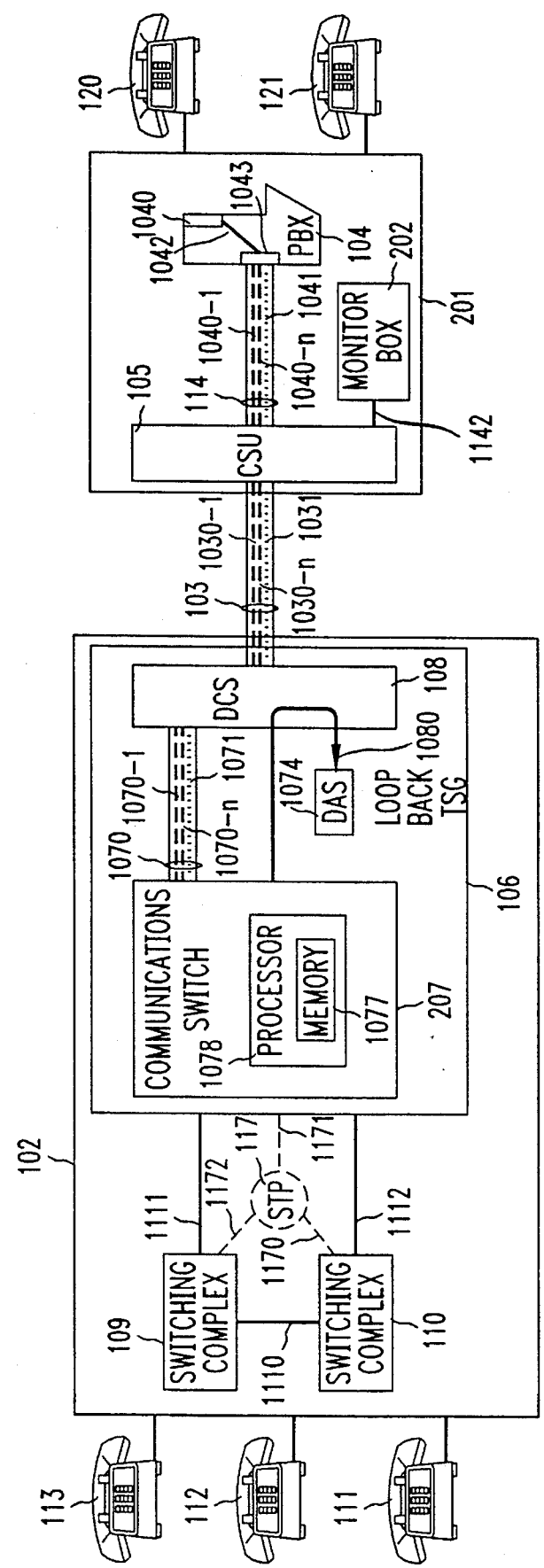
FIG. 2 shows an alternative arrangement for the terminating switch and the CPE of FIG. 1.

FIG. 2 shows an alternative arrangement for the termination switch and the CPE of FIG. 1. The major difference between the terminating switch 107 of FIG. 1 and the terminating switch 207 of FIG. 2 lies in the termination arrangement of Trunk SubGroup (TSG) 1070. Unlike FIG. 1 where TSG 1070 originates and terminates on switch 107, in FIG. 2, TSG 1071 originates from switch 207 but terminates on Digital Announcement System (DAS) 1074. The latter is a voice information system which delivers to callers a network-based user announcement that is triggered when all the bearer channels in TSG 1070 are occupied. Subscribers may wish callers to receive either a general announcement indicating that all lines are busy or a customized announcement (subscriber-specific) or an interactive announcement. Thus, DAS 1074 is arranged to perform specific functions depending on subscribers' preference. For example, DAS 1074 can a) prompt a caller for specific information by asking questions based on a set of modules in a transaction script, b) collect that information by detecting and interpreting Dual Tone Multifrequency (DTMF) signals entered by the caller or by recognizing speech input from the caller, and c) organize the collected information in a specific format and d) forward the collected information to CPE 201 via the signaling channels 1071 and 1032.

DAS 1074 is comprised of a call processing unit (not shown) which executes two types of programs, namely user-interface software programs and system software programs. User-interface software programs of DAS 1074 include modules of a transactions script which is a sequence of questions posed to a caller to elicit answers in the form of dual tone multiple frequency or speech input. The modules of a transaction script are executed to answer incoming calls destined for CPE 201, and to greet callers with pre-recorded voice prompts to direct callers to enter specific information. System software of DAS 1074, by contrast, include a) primitives to detect dual tone multiple frequency signals entered by the caller, and/or b) speech recognition software to identify speech input provided by a caller. A voice response unit may be implemented using the AT&T Conversant® Voice System, whose architecture and features are described in *AT&T Technical Journal* Vol. 65, Issue 5, pp. 34–47, September/October 1986.

The main difference between CPE 201 and CPE 101 lies in the presence of monitor box 202 connected to CSU 105 via a signal channel 1142. Monitor box 202 is a device, such as a protocol analyzer or a minicomputer with a suitable board arranged to a) detect electrical signals passing through the signal channel 1142, and b) decode those signals to extract calling party information associated with a blocked call.

Figures 3, 4:
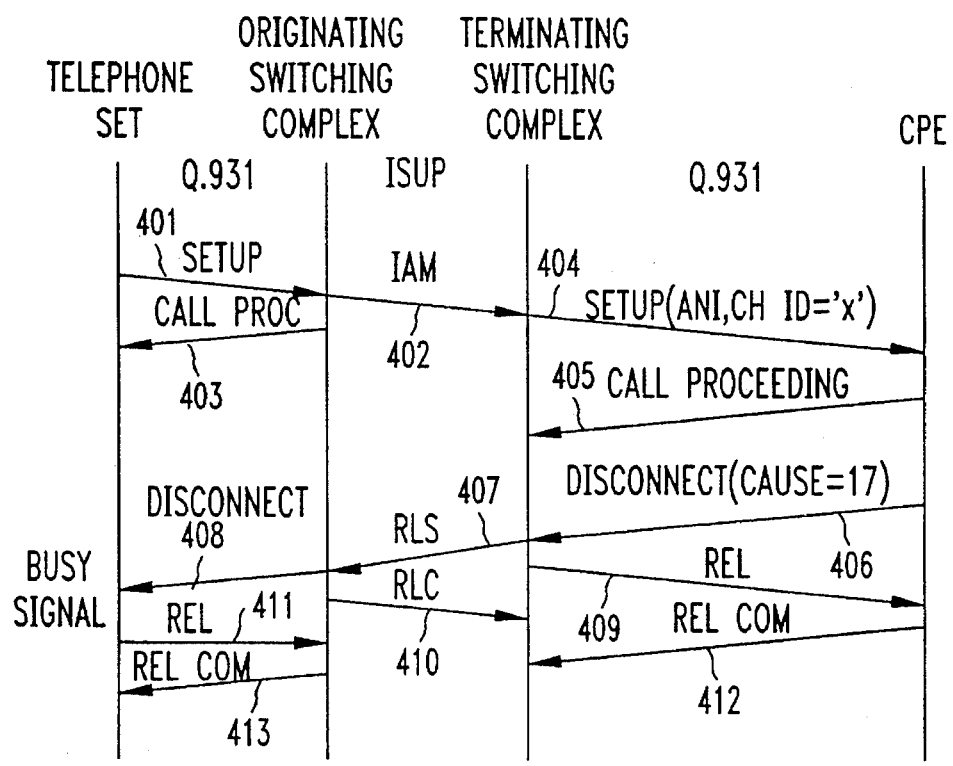
FIG. 3 shows an illustrative routing table that is stored in the memory of the terminating switch of FIG. 1.
FIG. 4 graphically portrays the flow of a call and the associated signaling messages as the call traverses different links and components of the communication system of FIG. 1.

FIG. 3 shows an illustrative routing table that is stored in the memory of the terminating switch of FIG. 1. The table of FIG. 3 shows that the subscriber routing number RN is associated with a number of channel identification numbers within a particular Trunk SubGroup Number. The routing number RN is the telephone number of the subscriber. This telephone number may be an 800-prefix or 900-prefix telephone number or a feature group B number. The channel identification numbers are unique identifiers consisting of a) a channel ID within a particular DS-1, such as "channel-id-1, and b) an interface ID shown in FIG. 3 as "TSG1" or "TSG2". When CPE 101 receives a signaling message, the channel ID and the interface ID are included in the message to indicate the particular communications or bearer channel (within a DS-1 ) and the interface through which the call is to be received. In this example, the table entry for TSG1 represents the regular TSG channels through which, incoming calls are routed to CPE 101. TSG2 represents the loop back TSG circuits that originate and terminate on the communications switch 107 in FIG. 1 or originate on communication switch 207 and terminate on DAS 1074 in FIG. 2.

When communications switch 107 (207) receives a signal from STP 117 indicating that an incoming call is destined for routing number RN, switch 107 (207) accesses the routing table of FIG. 3 to search for an idle channel associated with routing number RN. Since multiple channels are associated with routing number RN, the channel identification numbers in TSG1 and TSG2 are organized in a hunt group arrangement. In particular, the search sequence for the first available channel within the hunt group is a first listed/first called addressing system. More specifically, in the first listed/first called search sequence, communications switch 107 (207) looks for the first member in the hunt group. If the first member is busy, the search proceeds to the second member in the hunt group and so on until an available member is found. When all attempts to locate an available channel in TSG1 are unsuccessful, the communications switch 107 (207) looks for an available channel in TSG2.

A verification table which lists only the channel identifiers of TSG1 is also stored in the memory of PBX 104 of CPE 101 (201).

FIG. 4 graphically portrays the flow of a call and the associated signaling messages as the call traverses different links and components of the communication system of FIG. 1 or FIG. 2. The description of the call flow of FIG. 4 is provided concurrently with a description of the flowchart of FIG. 5 that shows a logical sequence of the actions taken and the decisions formulated by some components of the communications system of FIG. 1 to provide blocked called notification to a called party.

Looking at FIG. 4 from an horizontal perspective, it can be observed that each column in FIG. 4 has a demarcation line indicating a component of the communications system of FIG. 1 generating a signaling message. Those components include the station set 111 at the upper left hand corner, the originating and terminating switching complexes 109 and 106 in the middle of the top row, and CPE 101 in the upper right hand corner. For illustrative purposes, but without loss of generality, it is assumed that telephone set 111 is an ISDN-compatible set.

Figure 5:
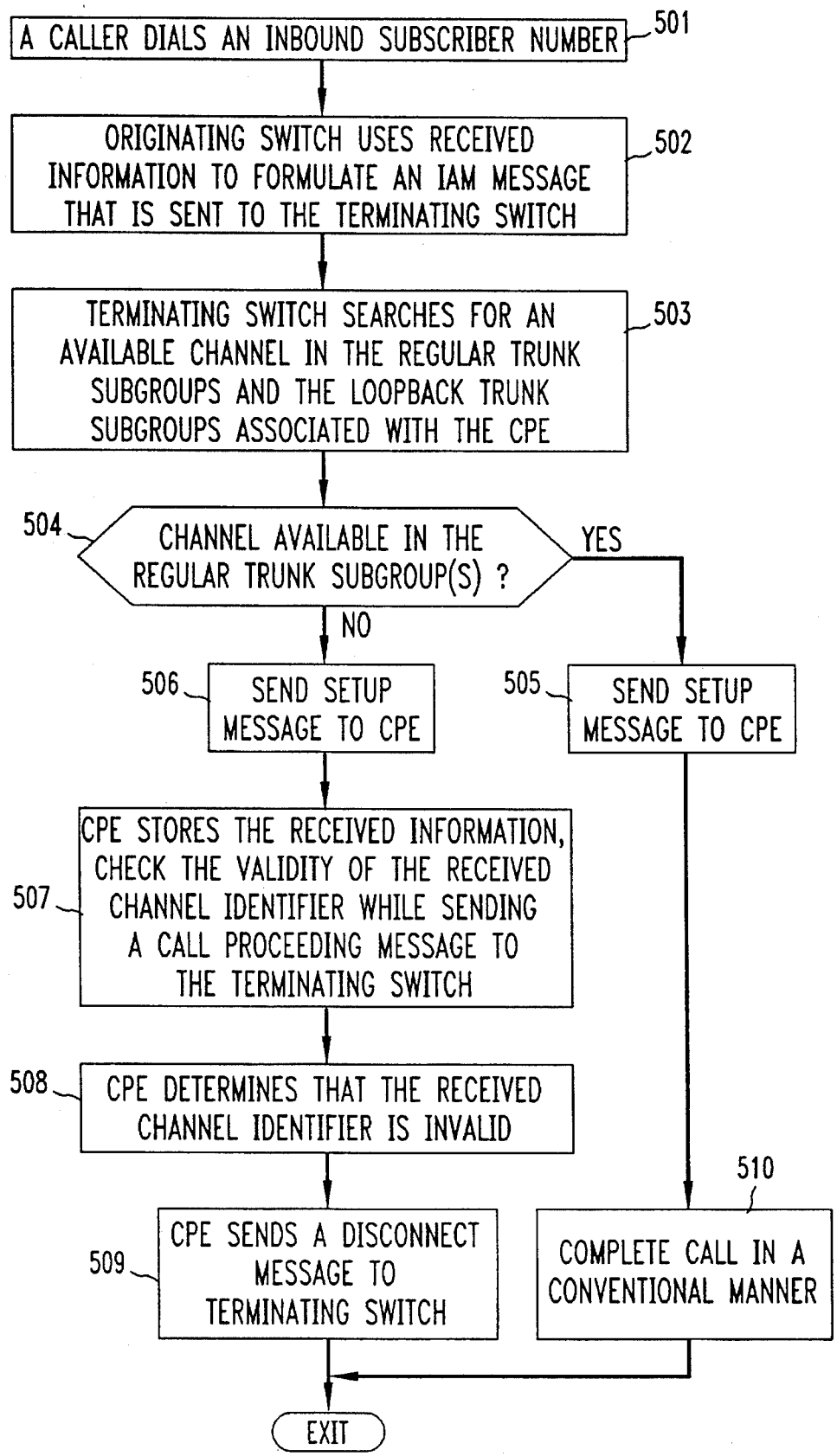
FIG. 5 shows a logical sequence of the actions taken and the decisions formulated by some components of the communications system of FIG. 1 to provide blocked called notification to a called party.

When station set 111 dials the inbound subscriber's number, in step 501 of FIG. 5, a Q.931 call SETUP message 401 is sent to the originating switching complex 109. As is well known to those skilled in the art, Q.931 is part of the User-to-Network Interface (UNI) of the Digital Subscriber Signaling System No. 1 (DSS1) standard that supports exchange of information between a communications switch and a terminal device. Because communications between switches are supported by the Network-to-Network Interface (NNI) of the ISDN User Part standard which is different from the DSS1 standard, originating switching complex 109 uses the information (called "Information Elements") received in the Q.931 signaling message to generate in step 502, an NNI-compliant Initial Address Message 402 that is sent to terminating switching complex 106 via STP 117. An Initial Address Message (IAM) consists of a set of call handling and user information parameters used to transmit signaling information between switching points prior to the establishment of a call. It ordinarily consists of Calling Party Number, Called Party Number, Carrier Selection, Service Code and other user-related types of information. For additional information on IAM, see BellCore document TA-NWT-000394 titled "Switching Systems Requirements for Interexchange Carder Interconnection Using the ISDN User Part." After forwarding the IAM to the terminating switching complex 106, originating switching complex 109 also sends a Q.931 CALL PROCEEDING message 403 to telephone set 111 to indicate that the call is being processed.

Upon receiving the IAM, switch 107 within terminating switching complex 106, in step 503, searches for an available channel in the regular Trunk Subgroup(s) (TSG) using the first listed/first called searching sequence described above. A determination is made in step 504, as to whether a channel is available in the regular TSG(s). If a channel is available in the regular TSG, in step 505, a Q.931 SETUP message 404 is sent to CPE 101. As shown in FIG. 4, the 404 SETUP message includes a) the Automatic Number Identification (ANI) also called calling party number (or a billing number), and b) the identifier of the channel through which the call is to be routed. In step 510, CPE 101 checks the validity of the channel identifier and upon determining its validity, completes the call in a conventional manner.

When no channel is available in the regular TSG(s), terminating switch 107 searches for an available channel in the loop back TSG. Upon finding an available channel, terminating switch 107, in step 506, sends a 404 Q.931 SETUP message (described above) to CPE 101. The latter, in step 507 stores the received ANI information and checks the validity of the received channel identifier while sending a Q.931 CALL PROCEEDING message 405 to the terminating switch. For each ANI information received, a record that is comprised of fields for the ANI, the date and the time the ANI is received, is created for storage in the CPE 101. When the CPE 101 determines, in step 508, that the channel identifier that was received as part of the Q.931 message, is invalid (i.e., is not a channel identifier for the regular TSG), CPE 101, in step 509, sends a Q.931 DISCONNECT message 406 to terminating switch 107. The Q.931 DISCONNECT message 406 includes a field called "cause value" which contains a code associated with the reason for generating the DISCONNECT message.

Once the terminating switch 107 receives the Q.931 DISCONNECT message from CPE 101, the processing of that message depends on the subscriber's preference for notifying the caller of the subscriber's inability for completing his or her call. If the subscriber wishes to have a busy tone applied to the caller's telephone set, CPE 101 includes a cause value "17" in the Q.931 DISCONNECT message. Thereafter, the terminating switch 107 forwards a) a RELEASE Q.931 message 409 to CPE 101, and b) an ISUP RELEASE message 407 to the originating switch 109 which, in turn, a) returns an ISUP release complete message 410 to terminating switch 107, and b) sends a Q.931 DISCONNECT message 408 to ISDN telephone set 111 and applies a busy tone signal to that set. The latter transmits a Q.931 RELEASE message 411 to originating switch 109 which returns a Q.931 RELEASE COMPLETE message 413 to telephone set 111. Similarly CPE 101, shortly after receiving the release message 406 from terminating switch 107 returns a Q.931 release complete message 412 to that switch.

If the subscriber wishes to have an announcement delivered to the caller using DAS 1074 of FIG. 2, the terminating switch 207 receives an ALERTING/PROGRESS message from the CPE 201, instead of a DISCONNECT message. The ALERTING message (not shown in FIG. 4) triggers cut-through back to the listen path which is terminated in the DAS 1074. The latter delivers the announcement and collects information if needed from the caller. Cut-through to the listen path of DAS 1074 is possible only when all the loop back channels are terminated at the DAS 1074. Alternatively, the CPE 201 may return a DISCONNECT message with a non-standardized cause value to trigger cut-through back to the listen path terminated in the DAS 1074. This alternative offers the advantage of allowing different messages to be relayed to different callers based on the cause value output by CPE 201. For example, a cause value of say 'XX' may be generated for preferred customers identified by their ANI, while a cause value of 'YY' may be generated for unknown callers.

Advantageously, the blocked call notification system of the invention allows inbound subscribers to know the number of blocked calls within any selected period of time and the phone number of each calling party whose call was blocked. A subscriber can use the blocked call ANI information to get a more complete profile of their callers and their calling habits. Information provided in the profile may include, for example, the geographic locations from which blocked calls originate, the distribution of the blocked calls at particular times of day, retrial behavior of callers whose first calls were blocked, to name a few.

Furthermore, subscribers can use the blocked ANI information to help determine whether their egress facilities are engineered properly by analyzing the distribution of blocked calls over different periods of time. Blocked Call Notification also gives subscribers a closer idea of their true "first-offered traffic load."

The foregoing merely illustrates the invention. Those skilled in the art will be able to devise numerous arrangements which, although not explicitly shown or described herein, embody the principles of the invention and are within their spirit and scope.

We claim:

1. A system for providing to a communications apparatus connected to a communications network, information associated with a call originated from a device connected to said communications network, and destined for said communications apparatus, said system comprising:

means responsive to said call for searching for an available communications channel in a a facility, said facility a) including a signaling channel and at least one communications channel, and b) providing a link between the communications apparatus and the communications network; and a delivery means for transmitting to the communications apparatus via the signaling channel of the facility, information associated with said call when no communications channel of the facility is available to route said call to the communications apparatus.

2. The system of claim 1 further comprising means responsive to a signal which indicates that no communications channel is available in the facility, for searching for an available communications channel in a second facility which is a) connected to the communications network and b) assigned to, but not connected to the communications apparatus; and means for delivering to the communications apparatus information associated with said call only when at least one communications channel is available in the second facility.

3. The system of claim 2 wherein the other facility is a loop-back facility which originates from the communications network and terminates on the communications network.

4. The invention of claim 1 wherein said information associated with the call includes at least one of the following fields: a calling party number, a called party number, a channel identification number and a trunk subgroup number.

5. The invention of claim 1 further comprising:

means for blocking the call at said communications network when no communications channel is available in the facility.

6. The invention of claim 1 further comprising means responsive to the delivery of the information associated with the call for generating a selected code in the communications apparatus which transmits said selected code to said communication network via said signaling channel; and means responsive to receiving said selected code in said communications network for playing a particular announcement to a caller who placed the call, as a function of the value of the selected code.

7. The invention of claim 6 further comprising means for collecting information from the caller for delivery to the communications apparatus.

8. The invention of claim 1 further comprising means for storing in the communications apparatus the delivered information associated with the call.

9. The invention of claim 8 further comprising means for calling back the caller using the stored information associated with the call.

10. The invention of claim 1 further comprising a voice information system that is connected to the communications network via a circuit which is assigned to, but not connected to the communications apparatus; and means for establishing a voice path between a caller who placed the call and the voice information system when no communications channel is available in the facility connected to the communications apparatus.

11. A communications network comprising at least one switch connected to a customer premises equipment via a first facility comprised of at least one communications channel and one signaling channel;

a lookup table in the switch that is accessed to ascertain availability of a communications channel in the first facility to route calls destined for the customer premise equipment; and means for sending via the signaling channel of the first facility information associated with the calls destined for the customer premises equipment when a) no communications channel of the first facility is available, and b) a communications channel is available in a second facility which a) is also connected to the switch and b) is assigned to, but not connected to the customer premises equipment.

12. The invention of claim 11 further comprising a voice information system which is connected to the switch via the second facility and which delivers announcements to callers placing the calls when no communications channel is available in said first facility wherein said announcements are delivered via a communication channel of said second facility.

13. The invention of claim 12 further comprising means for soliciting and collecting information from the callers; and means for delivering the collected information to the customer premises equipment when a communications channel of said first facility is idle.

14. A method of providing to a communications apparatus connected to a telephone network, information associated with a call, said method comprising the steps of:

receiving in said telephone network a connection request signal for said call, said signal being originated from a device connected to the telephone network in response to said signal, searching for an available communications channel in a facility, said facility a) including a signaling channel and at least one communications channel, and b) providing a link between the communications apparatus and the telephone network; and delivering to the communications apparatus over the signaling channel of the facility information associated with the call if no communications channel of the facility is available to route the call to the communications apparatus.

15. The method of claim 14 further comprising the step of in response to a signal which indicates that none of said communications channels is available in the facility, searching for an available channel in another facility which is assigned to, but not connected to the communications apparatus, wherein information associated with the call is delivered to the communications apparatus only if a channel is available in the other facility.

16. The invention of claim 14 wherein the delivered information associated with the call includes at least one of the following fields: a calling party number, a called party number, a channel identification number and a trunk subgroup number.

17. The invention of claim 14 further comprising the step of blocking the call at the telephone network when no communications channel is available in the facility.

18. The invention of claim 14 further comprising the steps of:

generating a selected code in the communications apparatus in response to the delivery therein of the information associated with call; and playing a particular announcement to a caller who placed the call, as a function of the value of the selected code.

19. The invention of claim 18 further comprising the step of:

collecting information from the caller for subsequent delivery to the communications apparatus when a communications channel of said facility becomes available.

20. The invention of claim 14 further comprising the step of:

storing in the communications apparatus the delivered information associated with the call.

21. The invention of claim 20 further comprising the step of:

calling back the caller using the stored information associated with the call.

22. The method of claim 14 wherein a voice information system is connected to another facility which is assigned to, but not connected to the communications apparatus, and wherein the method further includes the step of:

establishing a voice path from a caller placing the call to the voice information system when no communications channel is available in the facility linked to the communications apparatus.

23. A method of delivering call-related information to a subscriber's customer premises equipment connected to a communications network wherein said method comprises the steps of:

receiving in said communications network signaling information for calls originated from devices connected to said communications network, and destined for the customer premises equipment of the subscriber;

routing to the customer premises equipment the signaling information associated with each of said calls via a signaling channel of a first facility which a) includes at least one communications channel and said signaling channel, and b) links the customer premises equipment to a switch of the communications network, said routing of said signaling information occurring only when a) no communications channel of the first facility is available, and b) a communications channel is available in a second facility which is assigned to, but not connected to the customer premises equipment.

24. The invention of claim 23 further comprising the step of:

delivering announcements to callers placing said calls when no communications channel is available in the first facility, said announcements being generated by a voice information system which is connected to the switch via the second facility.

* * * * *